Sept. 5, 1967 R. T. BURNETT 3,339,683
AUTOMATIC ADJUSTER
Filed Jan. 8, 1965
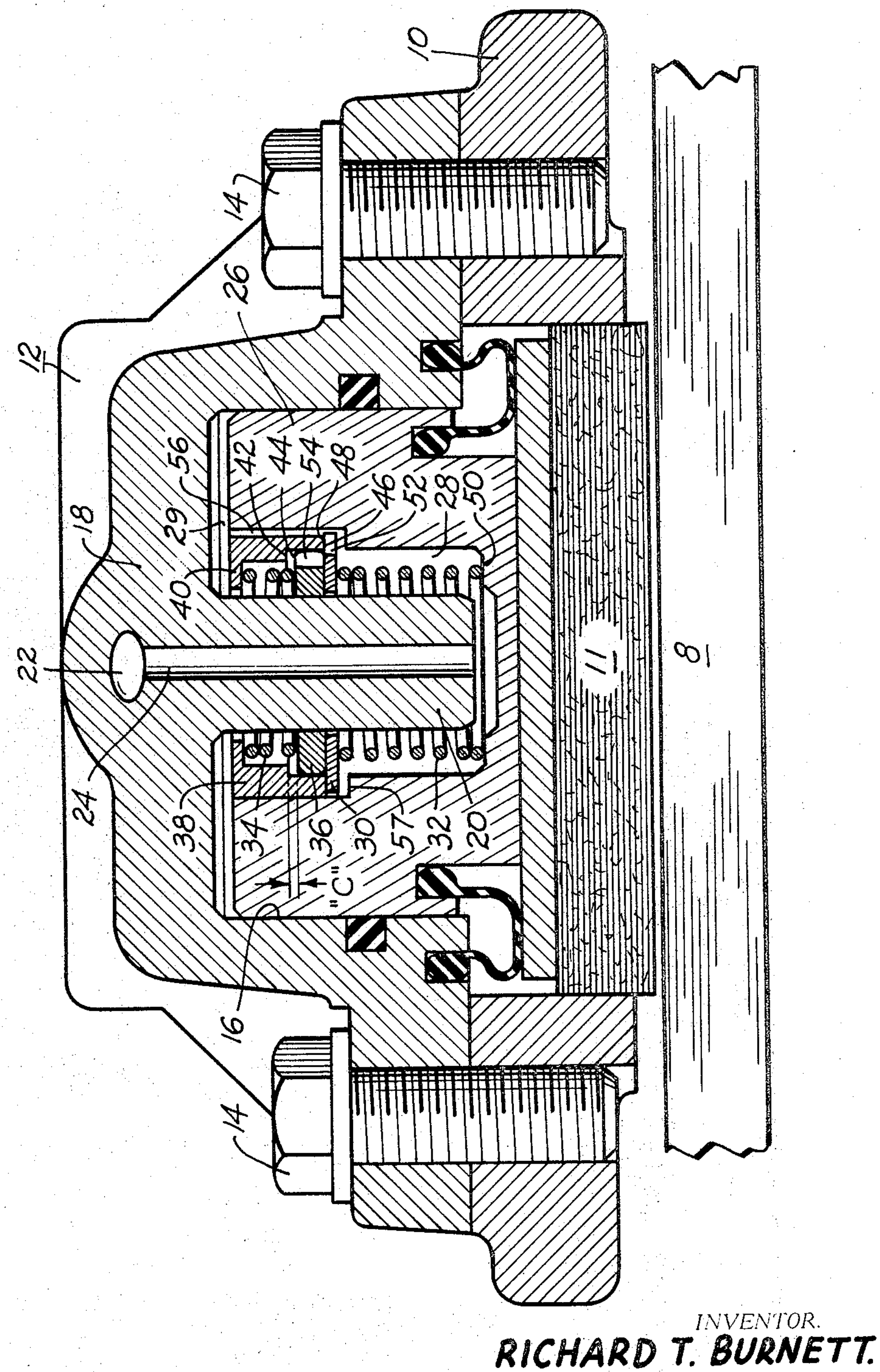
INVENTOR.
RICHARD T. BURNETT.
BY
Sheldon F. Raizes
ATTORNEY.

United States Patent Office 3,339,683
Patented Sept. 5, 1967

3,339,683
AUTOMATIC ADJUSTER

Richard T. Burnett, South Bend, Ind., assignor to The Bendix Corporation, South Bend, Ind., a corporation of Delaware Filed Jan. 8, 1965, Ser. No. 424,234
6 Claims. (Cl. 188—196)

This invention concerns an automatic adjuster for a disk brake or its equivalent.

An object of this invention is to provide a disk brake with an automatic adjuster which is capable of adjusting the brake released position of an actuating piston in accordance with wear of its associated brake shoe.

Another object of this invention is to provide the automatic adjuster with means whereby the piston is capable of being thrust rearwards by the disk during a kick-back condition without damaging the adjusting mechanism and is capable of being restored to its brake released position after the kick-back condition.

Still another object of this invention is to provide the automatic adjuster with means to ensure bleeding of the cavities associated with the adjuster.

An overall object of this invention is to produce a simple, efficient and inexpensive adjuster having the aforementioned features.

Other objects of the invention will become apparent from the folowing description with reference to the drawing wherein the single figure disclosed illustrates in section a portion of a well-known disk brake and depicting in particular a fluid motor and an automatic adjuster therefor.

Referring to the drawing, only one-half of a well-known stationary caliper and a disk 8 is illustrated with it being understood that the half on the opposite side of the disk 8 is the same. A stationary stirrup 10 is secured to a fixed part of a vehicle (not shown) and has an opening therein slidably receiving a brake shoe 11. A cylinder housing 12 is secured by bolts 14 to the stirrup 10 and comprises a bore 16 open at its front end and closed at its rear end by a wall 18. A tubular post 20 is integral or fixedly secured with the wall 18 and extends forwards therefrom along the axis of the bore 16. A fluid inlet port 22 is communicated to an axial passage 24 located in the post 20. A piston 26 is slidably disposed in the bore 16 and has an axially extending recess 28 which in conjunction with the portion 29 of the bore 16 exposed to the recess 28 defines a fluid chamber. The post 20 is received within the recess 28 and is surrounded by an annular washer 30, a kick-back return coil spring 32, a return spring 34, and an annular adjusting ring 36 which grips the post 20. An annular stepped fitting 38 is press-fitted onto the recess wall and is therefore fixedly secured to the piston 26 for movement therewith. The fitting 38 has an annular flange 40 receiving thereon the rear end of the return spring 34, an annular shoulder 42 disposed for thrust engagement with the rear surface 44 of the adjusting ring 36 and an end surface 46 disposed for abutting engagement with the rear surface 48 of the washer 30. The return spring is compressed between the flange 40 and the adjusting member 36 to urge the piston rearwards. The kick-back return spring 32 is compressed between the washer 30 and the annular shoulder 50 of the piston at the closed end of the recess 28 thereby urging the washer 30 against the end abutment surface 46 of the fitting 38. The kick-back return spring 32 is stronger than the return spring 34 resulting in the brake released position of the piston 26 being defined by engagement of the washer 30 with the adjusting ring 36. A running clearance C is provided between the shoulder 42 and the surface 44 on the adjusting ring 36 when the piston is in brake released position.

The washer 30, adjusting member 36, and the fitting 38 are provided with a plurality of circumferentially spaced notches 52, 54 and passages 56, respectively, for communicating to the rear of the piston 26 the fluid entering the front part of the recess 28 from the passage 24. The fluid path arrangement provides for complete bleeding of air from that portion of the recess in front of the adjuster assembly.

In assemblying the piston and the adjuster assembly in the cylinder housing, the entire adjusting mechanism is assembled on the piston 26 and then the assembly is placed in the bore 16 with the adjusting ring 36 being forced on the post through a thrust connection formed by engagement of the shoulder 57 with the washer 30 and engagement of the washer 30 with the adjusting ring 36.

In operation, the piston 26 will thrust the shoe 11 into braking engagement with the disk 8 upon brake application. The piston 26, the washer 30 and the fitting 38 will move relative to the post 20 and the adjusting ring 36 until the clearance C is taken up. Any further movement of the piston during brake application will result in the shoulder 42 engaging the adjusting ring 36 thereby providing a thrust connection therebetween to move the ring 36 forwards relative to the post 20 to a new position thereon in accordance with wear of the brake shoe. Upon release of braking pressure, the return spring 34 will retract the piston 26 and washer 30 relative to the post 20 and adjusting ring 36 until the washer 30 engages the adjusting ring 36. During a condition known as "kick-back," the rotor 8 will deflect the brake shoe which in turn imparts a rearward thrust on the piston 26. The piston will then move rearwards relative to the post 20, washer 30 and the adjusting ring 36 against the force of kick-back return spring 32 which, during kick-back condition, reacts on the adjusting ring 36. Therefore, this construction prevents damage to the adjuster components during kick-back condition.

From the above, it can be seen that a compact, simple adjuster which is easy to assemble has been provided for carrying out the above objects.

Although a specific embodiment is disclosed, numerous modifications thereof will be apparent to those skilled in the art. I intend to include in the scope of the following claims all equivalent applications of the invention whereby the same or substantially the same results may be obtained.

I claim:

1. In a disk brake or the like: a cylinder housing having a bore closed at the rear end thereof and open at the front end thereof, a piston slidably mounted in said bore having a recess opening onto the rear face thereof, a fixed member secured to the closed wall of said bore and extending forwardly therefrom into said recess, an adjusting member surrounding said fixed member and gripping the same, a pair of abutments carried by said piston, said abutments being spaced with one in front of the other, a retainer member having a portion located in front of said one abutment for engagement therewith and another portion located in front of said adjusting member for engagement therewith, said other of said abutments being located rearwardly of said adjusting member and arranged for thrust engagement therewith to overcome the gripping connection between said adjusting and fixed members to move said adjusting member to a new gripping position on said fixed member during forward movement of said piston, a resilient member acting on said piston and said retainer urging the latter rearwards into engagement with said one abutment, whereby upon rearward movement of said piston during a kick-back condition, said retainer will be engaged with said adjusting member and prevented from rearward movement thereby and said piston and abutments will move rearwardly relative to said fixed member and said retainer against the force of said resilient member and upon subsidence of said kick-back condition said piston will be returned forwardly by said resilient member until said retainer member is engaged by said one abutment member.

2. The structure as recited in claim 1 wherein said resilient member comprises a coil spring in compression surrounding said fixed member and having its rear end operatively connected to said retainer member and its front end operatively connected to said piston.

3. The structure as recited in claim 1 wherein second resilient means is provided, said second resilient means is operatively connected to said piston and reacts on said adjusting member for urging said piston rearwards to a brake released position, said first named resilient means is stronger than said second resilient means whereby said brake released position of said piston is defined by engagement of said retainer with said adjusting member.

4. The structure as recited in claim 2 wherein a second coil spring in compression surrounding said fixed member is provided, the rear end of said second coil spring is operatively connected to said piston and the front end thereof reacts on said adjusting member for urging said piston rearwards to a brake released position, said first named coil spring is stronger than said second coil spring whereby said brake released position of said piston is defined by engagement of said retainer with said adjusting member.

5. In a disk brake or the like: a cylinder housing having a bore closed at the rear end thereof and open at the front end thereof, a piston slidably mounted in said bore having an axially extending recess opening onto the rear face thereof, an elongated member fixedly secured to the closed wall of said bore and extending forwardly therefrom into said recess, an annular adjusting member surrounding said fixed member and gripping the same, a pair of annular abutments projecting from the wall of said recess into said recess and carried by said piston, said abutments being axially spaced with one in front of the other, a generally flat annular retainer member located in front of said adjusting member and said one abutment for engagement with each, said other of said abutments being located a predetermined distance rearwardly of said adjusting member and arranged for thrust engagement therewith to overcome the gripping connection between said adjusting and fixed members to move said adjusting member to a new gripping position on said fixed member during forward movement of said piston relative to said fixed member beyond said predetermined distance, a first coil spring surrounding said fixed member and compressed between the closed end of said recess and said retainer urging the latter rearwards into engagement with said one abutment, whereby upon rearward movement of said piston during a kick-back condition, said retainer will be engaged with said adjusting member and prevented from rearward movement thereby and said piston and abutments will move rearwardly relative to said fixed member and said retainer member against the force of said resilient member and upon subsidence of said kick-back condition said piston will be returned forwardly by said first coil spring until said retainer member is engaged by said one abutment member, a second coil spring surrounding said fixed member and compressed between said adjusting member and said piston for urging the latter rearwards relative to said fixed member to a brake released position, said first coil spring being stronger than said second coil spring whereby said brake released position of said piston is defined by engagement of said retainer with said adjusting member.

6. In a disc brake or the like as claimed in claim 1 wherein:

said adjusting member divides said recess into a forward portion and a rearward portion;

fluid inlet passage means located in said closed wall and said fixed member opening into said forward portion of said recess; and at least one notch in said adjusting member providing fluid communication between said front portion of said recess and the rear of said piston.

References Cited

UNITED STATES PATENTS

| | | | |
|---|---|---|---|
| 3,200,911 | 8/1965 | Rumelin | 188—196 |
| 3,223,207 | 12/1965 | Burnett et al. | 188—152 |

FOREIGN PATENTS

| | | |
|---|---|---|
| 1,332,337 | 6/1963 | France. |
| 1,332,804 | 6/1963 | France. |
| 1,342,626 | 9/1963 | France. |

DUANE A. REGER, *Primary Examiner.*